(12) United States Patent
Olivier et al.

(10) Patent No.: US 9,981,869 B2
(45) Date of Patent: May 29, 2018

(54) GRAVITY BENDING ON A DOUBLE SUPPORT

(71) Applicant: SAINT-GOBAIN GLASS FRANCE, Courbevoie (FR)

(72) Inventors: Thierry Olivier, Thourotte (FR); Udayan Paramban, Compiegne (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days. days.

(21) Appl. No.: 15/121,930

(22) PCT Filed: Feb. 23, 2015

(86) PCT No.: PCT/FR2015/050434
§ 371 (c)(1),
(2) Date: Aug. 26, 2016

(87) PCT Pub. No.: WO2015/128573
PCT Pub. Date: Sep. 3, 2015

(65) Prior Publication Data
US 2017/0073263 A1   Mar. 16, 2017

(30) Foreign Application Priority Data

Feb. 27, 2014 (FR) ..................................... 14 51598

(51) Int. Cl.
*C03B 23/027* (2006.01)
*C03B 23/00* (2006.01)
*C03B 23/03* (2006.01)

(52) U.S. Cl.
CPC ........ *C03B 23/0026* (2013.01); *C03B 23/027* (2013.01); *C03B 23/03* (2013.01); *Y02P 40/57* (2015.11)

(58) Field of Classification Search
CPC ........................... C03B 23/0026; C03B 23/027
See application file for complete search history.

(56) References Cited

U.S. PATENT DOCUMENTS 2,551,606 A * 5/1951 Jendrisak .............. C03B 23/027
                                                      65/107
2,608,030 A   8/1952 Jendrisak
(Continued)

FOREIGN PATENT DOCUMENTS

CN        1555310 A    12/2004
JP     2002-241140 A    8/2002
(Continued)

OTHER PUBLICATIONS

International Preliminary Report on Patentability and the Written Opinion of the International Searching Authority as issued in International Patent Application No. PCT/FR2015/050434, dated Aug. 30, 2016.
(Continued)

*Primary Examiner* — Lisa L Herring
(74) *Attorney, Agent, or Firm* — Pillsbury Winthrop Shaw Pittman, LLP

(57) ABSTRACT

A device for the gravity-bending of a glass sheet, includes a longitudinal roughing mold including two longitudinal roughing supports, and a finishing frame including two lateral finishing supports and two longitudinal finishing supports, the supports forming shaping rails. The distance between middles of the longitudinal finishing supports is shorter than that between middles of the lateral finishing supports. The roughing mold and finishing frame are movable vertically relative to each other during bending to switch from a rough-bending to a final-bending configuration. In the rough-bending configuration, the shaping rails of the longitudinal roughing supports are higher up than those of the longitudinal finishing support. In the final-bending configuration, the shaping rails of the longitudinal finishing supports are higher up than those of the longitudinal roughing supports. The shaping rails of the lateral finishing
(Continued)

supports are the only ones under lateral edges of the glass in the roughing and final-bending configurations.

15 Claims, 2 Drawing Sheets

(56) References Cited

U.S. PATENT DOCUMENTS

| | | | |
|---|---|---|---|
| 2,702,445 | A | 2/1955 | Jendrisak |
| 2,920,423 | A | 1/1960 | Carson et al. |
| 2,925,688 | A | 2/1960 | Carson |
| 3,235,350 | A | 2/1966 | Richardson |
| 4,119,424 | A | 10/1978 | Comperatore |
| 5,167,689 | A | 12/1992 | Weber |
| 5,660,609 | A | 8/1997 | Muller et al. |
| 5,849,057 | A | 12/1998 | Didelot |
| 5,893,941 | A | 4/1999 | Nikander |
| 6,076,373 | A | 6/2000 | Grodziski |
| 6,158,247 | A | 12/2000 | Didelot |
| 7,856,851 | B2 | 12/2010 | Chiappetta et al. |
| 8,119,224 | B2 | 2/2012 | Chiappetta |
| 8,156,764 | B2 | 4/2012 | Machura et al. |
| 9,193,619 | B2 | 11/2015 | Olivier et al. |
| 2005/0002081 | A1 | 1/2005 | Beteille et al. |
| 2007/0026238 | A1* | 2/2007 | Chiappetta .......... C03B 23/0252 428/426 |
| 2010/0236290 | A1 | 9/2010 | Fukami et al. |
| 2011/0123730 | A1 | 5/2011 | Chiappetta et al. |
| 2011/0314871 | A1* | 12/2011 | Olivier ................ C03B 23/0252 65/104 |
| 2015/0059410 | A1 | 3/2015 | Olivier et al. |

FOREIGN PATENT DOCUMENTS

| | | |
|---|---|---|
| WO | WO 2006/072721 A1 | 7/2006 |
| WO | WO 2007/077371 A1 | 7/2007 |

OTHER PUBLICATIONS

International Search Report as issued in International Patent Application No. PCT/FR2015/050434, dated Aug. 28, 2015.

* cited by examiner

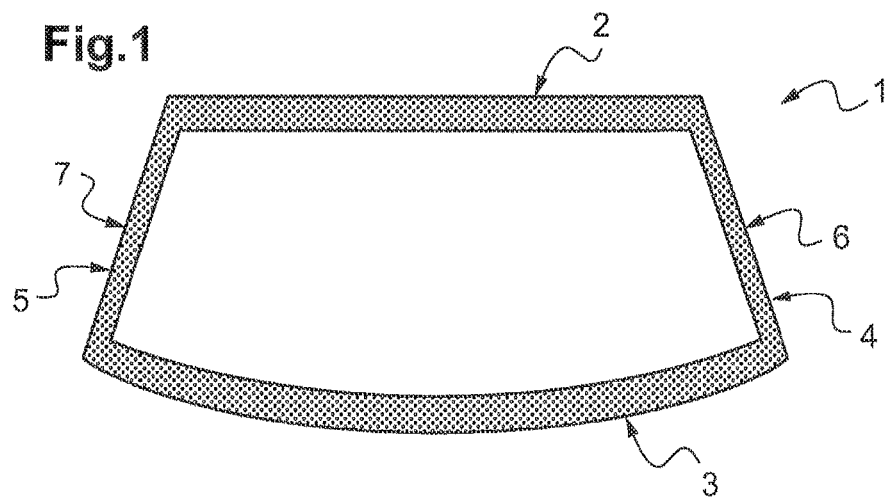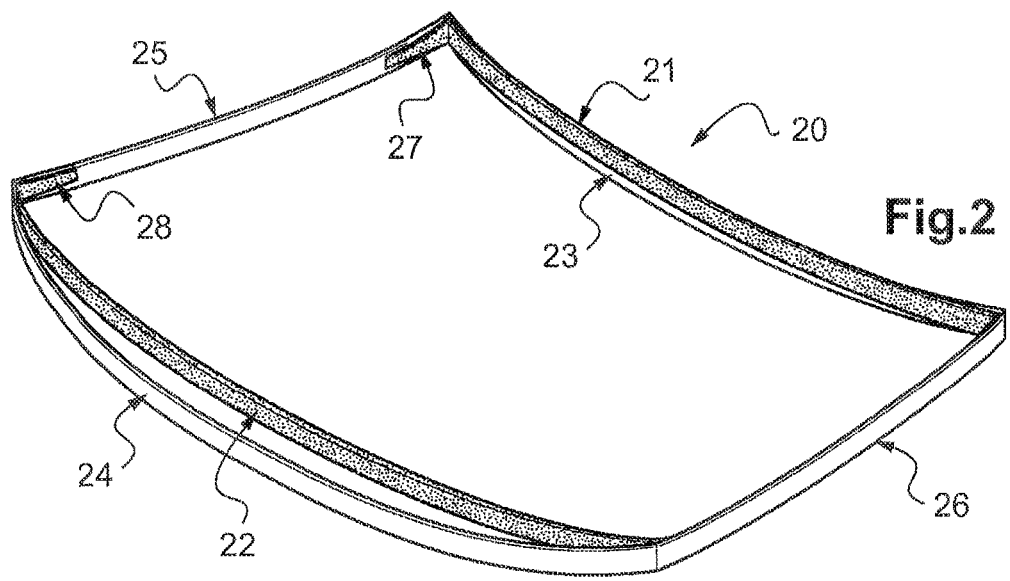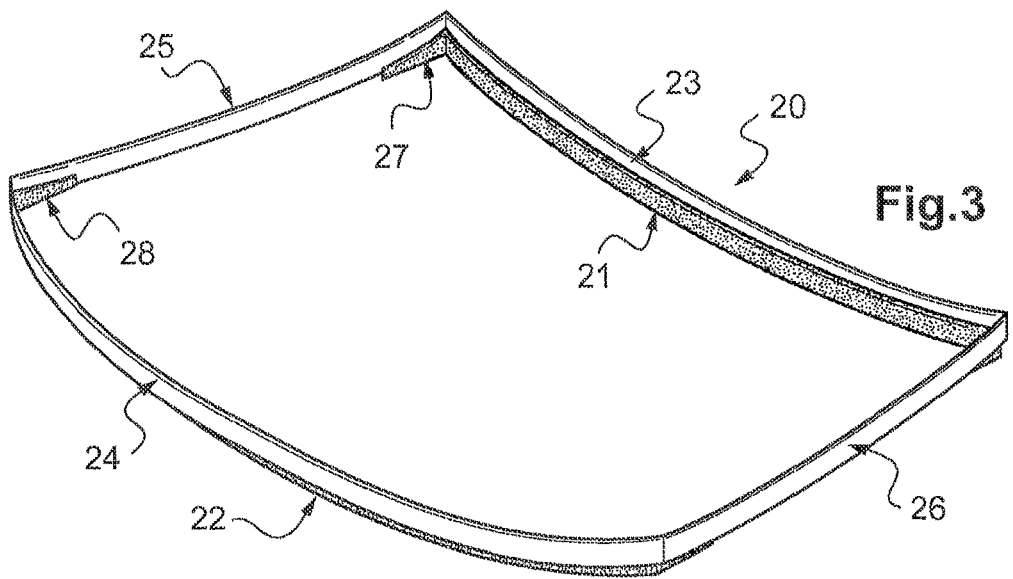

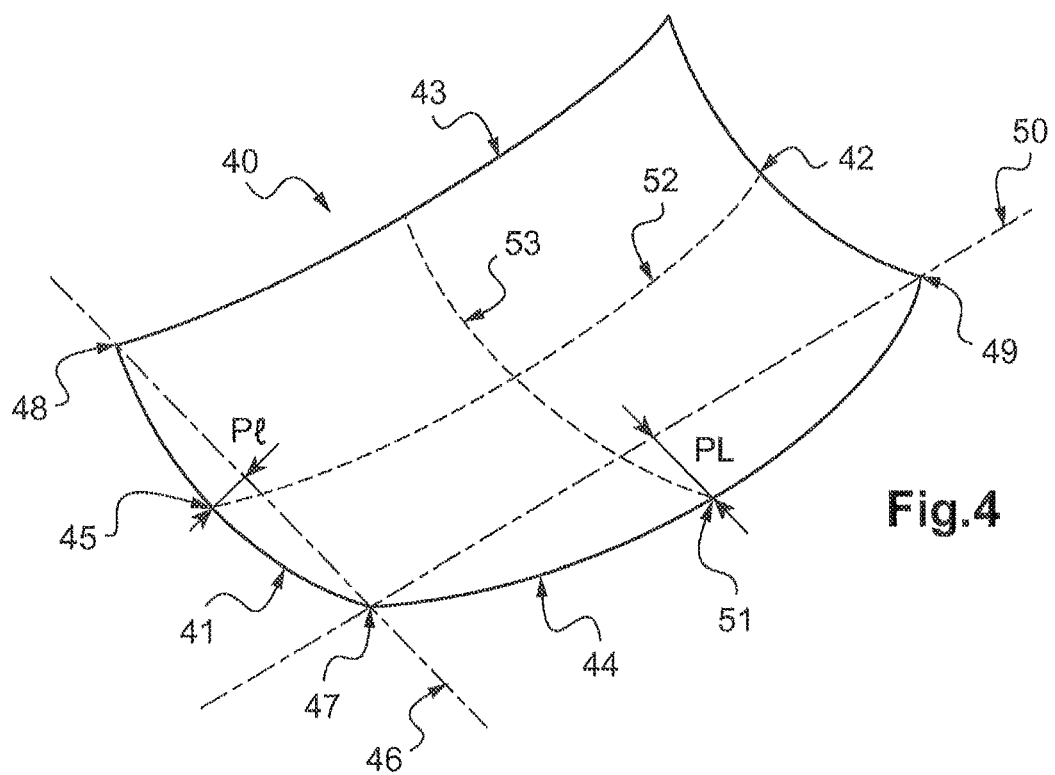
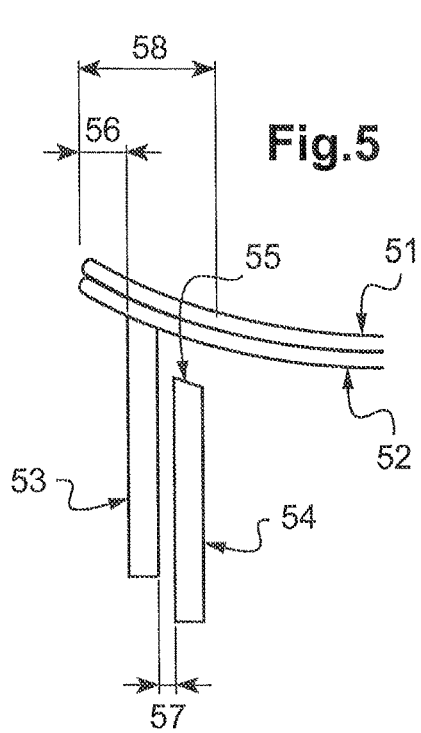
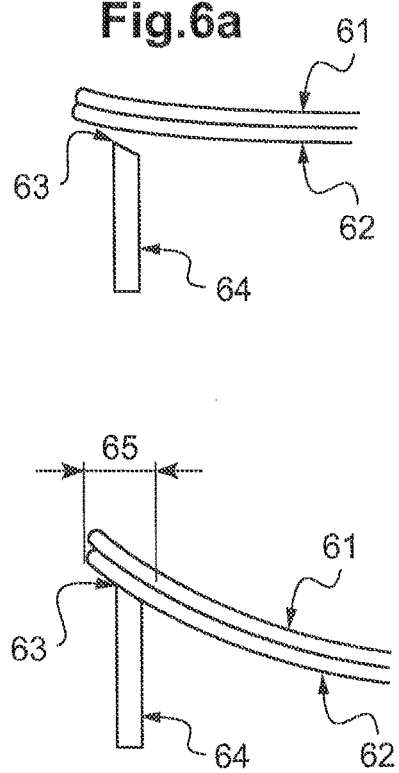

GRAVITY BENDING ON A DOUBLE SUPPORT

CROSS-REFERENCE TO RELATED APPLICATIONS

This application is the U.S. National Stage of PCT/FR2015/050434, filed Feb. 23, 2015, which in turn claims priority to French Application No. 1451598, filed Feb. 27, 2014. The contents of all of these applications are incorporated herein by reference in their entirety.

The invention relates to the gravity bending of sheets of glass on a gravity bending support comprising a mechanism that replaces at least one part of the sheet periphery support line during the course of the bending.

The gravity bending of sheets of glass on a bending frame is well known and may encounter the problem of the simultaneous formation of curves in mutually orthogonal directions. What happens is that bending on a single frame may lead to the formation of reverse bending which manifests itself in the formation of a reverse curvature at the corners of the sheet. Such defects are prohibitive and the more complex the shape to be given to the sheet, namely the more accentuated the end curvatures in mutually orthogonal directions, the more readily these occur. In order to alleviate this problem, U.S. Pat. No. 5,167,689 proposes to carry out gravity bending on a device comprising two frames that substitute one for the other. In an alternative form, the lateral supports are substituted during the course of the bending. U.S. Pat. No. 5,660,609 teaches a bending device comprising a first frame intended to support the periphery of the sheet of glass that is to be bent during a first bending stage, a second frame substituting for the first to support the periphery of the sheet of glass during the second stage of bending, and means for at all times mastering the forces applied to the sheet of glass as these forces transfer from the first frame to the second frame.

The higher the bending temperature, the more rapid the gravity bending will be. However, a higher temperature encourages the formation of marks and optical distortions at the periphery of the curved sheet following contact between the glass and the bending tool. When the periphery of the sheets of glass is coated with an enamel, the peripheral defects are hidden by the enamel. Thus, the peripheral enamel generally covers the entire peripheral region of the sheet of glass that has been supported by the two frames. As these frames supporting the glass along peripheral lines sit closely side by side, and because there has to be a certain clearance (of the order of 4 to 9 mm) between the two frames, and because in addition there has to be a certain amount of space between the edge of the glass and the outermost support frame, the enamel covers the edges of the glass over a not-inconsiderable distance of the order of at least 20 mm and even at least 23 mm from the edge of the sheet. The presence of such black enamel is commonplace these days on the windshields of road vehicles (automobiles, trucks, motor coaches, etc.). However, certain manufacturers wish to reduce the width of the enamel for visibility and esthetic reasons, in the region of the uprights flanking these windshields. These uprights (the A-pillars) are the vehicle structures which, from the interior of said vehicle, appear substantially vertical and hold the windshield along the sides. They form the connection between the roof and the rest of the vehicle bodywork. These pillars hold the two lateral edges of the windshield, which are not as long as the two longitudinal edges of the windshield, the latter edges being substantially horizontal once the windshield is mounted on the vehicle. Because of this sizing, the distance between the middles of the longitudinal edges of the windshield is shorter than the distance between the middles of the lateral edges of the windshield. The same is of course true of each sheet of glass included in the windshield. Indeed windshields are generally laminated and contain several sheets of glass (generally two sheets of glass) separated by sheets of polymer material such as polyvinylbutyral referred to as PVB.

When mention is made of the middle of an edge of a sheet of glass this means the point situated at the same developed distance from each end of the edge following the edge of the sheet and the curvatures of the glass. It is therefore a developed distance. When mention is made of the middle of a support this means the point situated at the same developed distance from each end of the support following the profile of the support viewed from above and the curvatures thereof. It is therefore a developed distance.

The rate of gravity bending is also dependent on the size of the sheet of glass. Indeed the larger the sheet, the greater the weight of the glass to produce its effect, and the more rapidly a given degree of sag will be obtained. Bending between two widely-spaced supports is therefore more rapid than between two closely-spaced supports. This is why the lateral bending, namely the creation of curvatures from one longitudinal edge to the other takes longer than the longitudinal bending, namely the creation of curvatures from one lateral edge to the other. The use of two successive supports to support and bend one edge of the sheet of glass necessarily entails a loss of time. Indeed, once the entire border of the glass is touching the first support, the glass remains in contact therewith for a certain length of time before the second support, the curvature of which is more pronounced, replaces it. This time spent waiting on the first support with the smaller curvature is a loss of time. According to the prior art, when a device comprising two successive supports is used, according to one embodiment the longitudinal edges of the glass can be supported by the same pair of supports from the start of bending to the end. In that case, the lateral edges of the sheet are, however, supported by two different pairs of supports in succession, the pair involved at the end having the final curvatures desired for the glass. It has now been found that it was possible and advantageous to use a single pair of lateral supports to support the lateral edges of the sheet of glass whereas two successive supports support the longitudinal edges thereof. Indeed in this case, the lateral supports have the desired final shape for the sheet of glass and the bending of these two lateral edges is not interrupted during the course of bending by a rough-molding support of a shape intermediate to the final shape. This is all the more advantageous as it is the lateral bending, namely the formation of curvatures from one longitudinal edge to the other, that is the more difficult because of the shorter distance between the longitudinal edges. During the bending process, while the lateral edges of the sheet of glass come into contact with just one single pair of lateral supports having the desired final shape of the lateral edges of the sheet, finishing longitudinal supports having the desired final shape of the longitudinal edges of the sheet replace, during the course of the bending, roughing longitudinal supports of an intermediate shape and therefore having a curvature that is not as pronounced as that of the finishing longitudinal supports.

The supports to which the present application refers are often known by those skilled in the art as a "skeleton mold" which means that they consist of a continuous strip of metal one edge face of which faces upwards and acts as a rail for shaping and supporting the glass. This edge face is generally not as wide as the strip of metal is tall. As a surface for contact with the glass, this edge face generally has a width in the range from 2 to 10 mm. The purpose of these supports is to support the edge of the glass, namely the peripheral zone of a main surface of a sheet of glass, the support/glass contact never coming inside said surface to more than 23 mm from the edge of the sheet of glass. A shaping rail is a surface intended to come into contact with the glass in order to give it a shape. In the context of the present invention, the term "rail" may simply be used in place of "shaping rail" for the sake of simplification. In practice, a bending support is always covered by a refractory fabric well known to those skilled in the art in order to lessen the marking of the glass by the support, so that the shaping rail that comes into contact with the glass is in fact made up of this refractory fabric. For the sake of simplicity of wording, no further mention is made of this fabric at the surface of the supports, it being understood that it is generally present.

The invention relates to a device for the gravity-bending of a sheet of glass, comprising a longitudinal roughing mold comprising two longitudinal roughing supports, and a finishing frame comprising two lateral finishing supports and two longitudinal finishing supports, said supports forming shaping rails, the distance between the middles of the longitudinal finishing supports being shorter than the distance between the middles of the lateral finishing supports, the roughing mold or the finishing frame being able to be moved vertically one relative to the other during bending in order to switch from a rough-bending configuration to a final-bending configuration, in the rough-bending configuration, the shaping rails of the longitudinal roughing supports being higher up than the shaping rails of the longitudinal finishing supports, and, in the final-bending configuration, the shaping rails of the longitudinal finishing supports being higher up than the shaping rails of the longitudinal roughing supports, the shaping rails of the lateral finishing supports being the only shaping rails under the lateral edges of the glass in the rough-bending configuration and in the final-bending configuration.

The shaping rails of the lateral finishing supports are therefore the support shaping rails that are the highest up and able to take the glass under the lateral edges of the glass both in the rough-bending configuration and in the final-bending configuration.

When the roughing mold is in the raised position, the rail of the longitudinal roughing supports is entirely above the rail of the longitudinal finishing supports. In this configuration, the glass touches the rail of the longitudinal roughing supports and does not touch the rail of the longitudinal finishing supports. During the rough-bending step during which the glass is in contact with the pair of longitudinal roughing supports, the lateral edges of the glass are directly above the pair of lateral finishing supports, without any other component being closer to the glass than these lateral finishing supports. In general, at least partial contact is made between the glass and the lateral finishing supports while the longitudinal edges are still in contact with the longitudinal roughing supports.

Throughout the bending process, the middle of the lateral edges of the sheet touches only the lateral finishing supports during the course of the bending. The same is generally true of the entirety of the lateral edges of the sheet which generally touch only the lateral finishing supports during the course of bending.

When the roughing mold is in the lowered position, the peripheral line of contact of the sheet of glass consists of the two longitudinal finishing supports and the two lateral finishing supports.

The movement of the roughing mold and/or the finishing frame is a relative vertical movement of one with respect to the other, it being understood that it is possible for just the roughing mold to be mobile or for just the finishing frame to be mobile or for the roughing mold and the finishing frame both to be mobile. The time saved through the use according to the invention of a single pair of finishing lateral supports may even be put to good use to lower the bending temperature at the lateral edges of the sheet of glass, particularly at the middle of each of these lateral edges. Thus, by virtue of the invention, the temperature at the middle of each of the lateral edges of the sheet of glass can remain below 615° C. and even below 610° C. The same bending of the lateral edges with the successive use of two lateral supports would be obtained in the same time with a temperature of above 620° C. This possibility of lowering the temperature furthermore makes it possible to reduce the significance of the defects caused by contact with the support and the lateral edges of the sheet of glass.

For preference, the roughing mold lies on the inside of the finishing frame when viewed from above, so that the finishing frame supports the sheet of glass closer to its edge than does the roughing mold. In that way, the roughing mold is circumscribed by the finishing frame when viewed from above. In general, there are 4 to 10 mm of glass at the edge of the sheet that are not supported on the finishing frame at the end of bending. This is the distance between the edge of the glass and the finishing frame. In an alternative form, the roughing mold may equally lie on the outside of the finishing frame.

The finisher preferably has no articulations. It is therefore preferably a strip of metal that is completely continuous over its entire perimeter with no opening or division into several parts. There is thus no risk of various parts of the finisher not meeting properly in transitions from one to another, constituting for example a difference in level that may make a mark on the glass. The existence of an adjusting device for very precisely regulating the position of the various parts of the finishing frame is therefore not needed.

The sheet of glass undergoing the bending method according to the invention may just after the latter potentially undergo a press-bending operation like that described in WO 2006072721 for example.

According to the invention, one sheet of glass may be bent individually. According to the invention, several, generally two, superposed sheets of glass can also be bent simultaneously. The simultaneous bending of several superposed sheets of glass is advantageous when these various sheets are intended to be assembled into one and the same laminated glazing, notably of the windshield type. Specifically, the various sheets of glass thus bent simultaneously have ideally identical shapes, something which is favorable for the quality of the assembly. Assembly into a laminated glazing calls for techniques known to those skilled in the art.

The invention is particularly well suited to the bending of sheets of glass having a lateral bending depth of between 5 and 20 mm and generally between 8 and 17 mm, these values being obtained at the end of bending according to the method of the invention. The lateral bending depth is the longest length of segment between the lateral edge of the glazing and the straight line connecting the two ends of the lateral edge in question, said segment being orthogonal to said straight line.

The invention is particularly well suited to the bending of sheets of glass having a depth of longitudinal bending of between 40 and 150 mm, these values being obtained at the end of bending according to the method of the invention. The depth of longitudinal bending is the longest length of segment between the longitudinal edge and the straight line connecting the two ends of the longitudinal edge in question.

The invention is particularly well suited to the bending of sheets of glass in which the ratio of the developed distance between the middles of the lateral edges of the sheet to the developed distance between the middles of the longitudinal edges of the sheet ranges from 1.3 to 2.

The invention is particularly well suited to the bending of sheets of glass combining both a depth of lateral bending of between 5 and 20 mm, a depth of longitudinal bending of between 40 and 150 mm and a ratio between the developed distance between the middles of the lateral edges of the sheet to the developed distance between middles of the longitudinal edges of the sheet ranges from 1.3 to 2.

The invention is of particular benefit when the depth of longitudinal bending is great and the depth of lateral bending is modest, according to the bending depth values that have just been mentioned. Indeed when the longitudinal bending is great, the two lateral edges of the glass move appreciably closer together during this bending. If the lateral edges of the glass touch the lateral supports prematurely then the glass will slip on the lateral support over a significant distance during the longitudinal bending, and this carries the risk of increasing the marking produced on the glass. This is why it is preferable, as far as possible, for the lateral edges of the glass to touch the lateral finishing supports as late on as possible.

The invention also relates to a method for the gravity-bending of a sheet of glass using the device according to the invention. According to this method, the gravity-bending of a sheet of glass takes place at a deformation temperature on the device according to the invention. The sheet of glass comprises two lateral edges and two longitudinal edges, the distance between the middles of the longitudinal edges of the sheet being shorter than the distance between the middles of the lateral edges of the sheet. The sheet is first of all supported by the device in the rough-bending configuration in order to undergo rough-bending, the longitudinal edges of the sheet being bent by contact with the shaping rails of the longitudinal roughing supports, then the device switches to the final-bending configuration in order to make the sheet undergo a final bending, the sheet then being bent in contact with the shaping rails of the longitudinal finishing supports and in contact with the shaping rails of the lateral finishing supports.

Having been raised to a deformation temperature, the sheet of glass is bent under gravity and in contact with the longitudinal roughing supports. A contact, possibly partial contact, may be achieved during this first step with the lateral finishing supports. Next, the roughing frame is retracted downward in a relative movement with respect to the finishing frame, so that the longitudinal roughing supports are under the longitudinal finishing supports, and the sheet of glass is bent on the lateral finishing supports and the longitudinal finishing supports of the finishing frame. In general, the sheet of glass is laid onto the device according to the invention at ambient temperature, said device then being conveyed into an oven so that the sheet of glass can reach a deformation temperature, generally in excess of 590° C. When the flat sheet is laid at ambient temperature on the device according to the invention the sheet, because of its flatness, touches it at just four points, more or less in the corners, these four points generally belonging to the longitudinal roughing supports. During the first bending step, referred to as rough bending, the glass sags under the effect of its weight and its longitudinal edges generally go so far as to follow entirely the shaping rails of the longitudinal roughing supports. At the end of this intermediate step, contact between the glass and the lateral finishing supports may be just partial or even nonexistent. Notably, it is possible for the middles of the lateral edges not to come into contact with the shaping rails of the lateral finishing supports. Thereafter, during the transition from the rough-bending configuration to the final-bending configuration, the longitudinal finishing supports substitute for the longitudinal roughing supports and bending continues until, at the end of the bending, the edges of the sheet fully follow the shaping rails of the longitudinal finishing supports and the shaping rails of the lateral finishing supports.

The transition from the roughing mold to the finishing frame is achieved by mechanisms known to those skilled in the art, it being possible notably for said mechanism to be progressive, following the principle of the one described in WO 2007077371.

Thanks to the invention, a curved glazing, notably of the laminated windshield type, comprising a narrow layer of enamel along its lateral edges, notably of a width less than 15 mm, notably at the middle of the lateral edges, can be achieved. The layer of enamel along the longitudinal edges of this same glazing may be of a width greater than 15 mm or even greater than 20 mm. The device and method according to the invention have been specially designed for the manufacture of such glazing. The layer of enamel that is particularly narrow along the lateral edges is the direct consequence of the fact that the shaping rails of the lateral finishing supports are the only shaping rails under the lateral edges of the glass in the rough-bending configuration and in the final-bending configuration.

In the case of laminated glass, the enamel is generally applied to one face of just one of the sheets that are to be assembled, and in such a way that this face bearing the enamel lies on the inside of the laminated glass in contact with a polymer interlayer and does not constitute an external face of the glass.

FIG. 1 depicts a motor vehicle windshield 1 made of laminated glass. It has been bent using the method according to the invention. This glazing comprises a top longitudinal edge 2, a bottom longitudinal edge 3, and two lateral edges 4 and 5. A peripheral layer of black enamel darkens the border of the glazing. The width of this layer of enamel is reduced (under 15 mm) along the lateral edges and notably at the middles 6 and 7 of these lateral edges 4 and 5. The width of the layer of enamel is greater (more than 15 mm) along the longitudinal edges 2 and 3.

FIG. 2 depicts a bending device 20 according to the invention. This device comprises a roughing mold consisting of two longitudinal roughing supports 21 and 22 and a finishing frame comprising two longitudinal finishing supports 23 and 24 and two lateral finishing supports 25 and 26. This device is shown at the start of bending, with the roughing mold in the raised position relative to the finishing frame. The tabs 27 and 28 fixed to the ends of the longitudinal roughing supports 21 and 22 orthogonally with respect to the latter are intended to give the latter rigidity and do not serve to support the glass. Two other equivalent tabs exist at the non-visible other two ends of the longitudinal roughing supports 21 and 22. In the configuration shown in FIG. 2, if a sheet of glass is being bent on the device, after being heated to its deformation temperature the glass comes into contact with the pair of longitudinal roughing supports 21 and 22 and, if appropriate, with the two lateral finishing supports 25 and 26. In general, the roughing mold is retracted downward before the glass touches the entirety of the lateral finishing supports.

FIG. 3 depicts the same support 20 of FIG. 2, except that it is in the configuration for the end of bending. The roughing mold has thus been retracted downward and the glass is therefore resting on the lateral finishing supports and the longitudinal finishing supports 23 and 24.

FIG. 4 depicts what is meant by the depth of lateral bending and depth of longitudinal bending on a glazing 40 having two lateral edges 41 and 42 and two longitudinal edges 43 and 44. The lateral bending depth Pl is the greatest length of segment between the lateral edge of the glazing and the straight line 46 connecting the two ends 47 and 48 of the lateral edge in question, said segment being orthogonal to said straight line 46. In FIG. 4, it is the point 45 that is furthest from the straight line 46. The depth of longitudinal bending PL is the greatest length of segment between the longitudinal edge and the straight line 50 connecting the two ends 47 and 49 of the longitudinal edge in question, said segment being orthogonal to said straight line 50. In FIG. 4, it is the point 51 that is furthest from the straight line 50. The longitudinal bending corresponds to the formation of curvatures between the lateral edge 41 and the lateral edge 42, as is the case with the curvature 52. The lateral bending corresponds to the formation of curvatures between the longitudinal edge 43 and the longitudinal edge 44 as is the case with the curvature 53.

FIG. 5 depicts two superposed sheets of glass 51 and 52 on the device according to the invention in the final-bending position and in a view from the side, which means to say that the plane of the figure passes through the middle of the longitudinal supports. These two sheets are intended to be assembled into a laminated glazing. The bottom sheet of glass is in contact with the shaping rail of the longitudinal finishing support 53. The longitudinal roughing support 54 has been retracted downward so that its shaping rail 55 is no longer touching the glass. The sheet protrudes beyond the finishing frame by the distance 56 corresponding to the 4 to 10 mm of glass at the periphery of the sheet not supported on the finishing frame at the end of bending. The distance 58 is the distance that can have the layer of enamel in the final glazing in order to cover all of the peripheral zone that has been in contact with the supports 53 and 54, which are separated from one another by a clearance 57.

FIG. 6 depicts two superposed sheets of glass 61 and 62 on the device according to the invention in a longitudinal view which means to say that the plane of the figure passes through the middle of the lateral supports. At a), the sheets are at the end of rough-bending and, in the instance depicted, the glass has not yet touched the shaping rail in the middle of the lateral support 64. At b) the sheets are at the end of final bending and the glass has conformed to the shaping rail 63 of the lateral support 64. In a) as in b) there is no other support shaping rail closer to the glass than that 63 of the lateral finishing support 64. It may therefore be stated that the shaping rails of the lateral finishing supports are the shaping rails highest up under the middles of the lateral edges of the glass in the rough-bending configuration and in the final-bending configuration. Because of the use of just one lateral finishing support 64, the layer of enamel can encroach over a distance 65 from the lateral edge of the final glazing that is shorter than the distance of enamel from the longitudinal edge of the final glazing (denoted 58 in FIG. 5).

The invention claimed is:

1. A method for gravity-bending of a sheet of glass at a deformation temperature using a device comprising a longitudinal roughing mold comprising two longitudinal roughing supports, and a finishing frame comprising two lateral finishing supports and two longitudinal finishing supports, said supports forming shaping rails, a distance between middles of the longitudinal finishing supports being shorter than a distance between middles of the lateral finishing supports, the longitudinal roughing mold or the finishing frame being able to be moved vertically one relative to the other during bending in order to switch from a rough-bending configuration to a final-bending configuration, the sheet of glass comprising two lateral edges and two longitudinal edges, a distance between the middles of the longitudinal edges of the sheet being shorter than a distance between the middles of the lateral edges of the sheet, the method comprising:

supporting the sheet of glass by the device in the rough-bending configuration and, in order to undergo rough-bending, the longitudinal edges of the sheet of glass being bent by contact with the shaping rails of the longitudinal roughing supports, and switching the device to the final-bending configuration in order to make the sheet of glass undergo a final bending, the sheet of glass then being bent in contact with the shaping rails of the longitudinal finishing supports and in contact with the shaping rails of the lateral finishing supports, wherein, in the rough-bending configuration, the shaping rails of the longitudinal roughing supports are higher up than the shaping rails of the longitudinal finishing supports, and wherein, in the final-bending configuration, the shaping rails of the longitudinal finishing supports are higher up than the shaping rails of the longitudinal rough-molding supports, and wherein the shaping rails of the lateral finishing supports are the only shaping rails under the two lateral edges of the glass in the rough-bending configuration and in the final-bending configuration, and wherein at the end of bending, a depth of longitudinal bending is between 40 and 150 mm.

2. The method as claimed in claim 1, wherein during the rough bending, the longitudinal edges of the sheet of glass fully follow the shaping rails of the longitudinal roughing supports.

3. The method as claimed in claim 1, wherein during the rough bending, the lateral edges of the sheet of glass come at least partially into contact with the shaping rails of the lateral finishing supports.

4. The method as claimed in claim 1, wherein, at the end of the bending, the edges of the sheet fully follow the shaping rails of the longitudinal finishing supports and the shaping rails of the lateral finishing supports.

5. The method as claimed in claim 1, wherein a temperature at the middle of each of the lateral edges of the sheet of glass remains below 615° C.

6. The method as claimed in claim 5, wherein the temperature at the middle of each of the lateral edges of the sheet of glass remains below 610° C.

7. The method as claimed in claim 1, wherein a plurality of superposed sheets of glass are bent simultaneously.

8. The method as claimed in claim 7, wherein the plurality of superposed sheets of glass is two.

9. The method as claimed in claim 1, wherein a curvature of the two longitudinal roughing supports is less pronounced than that of the two longitudinal finishing supports.

10. A method for gravity-bending of a sheet of glass at a deformation temperature using a device comprising a longitudinal roughing mold comprising two longitudinal roughing supports, and a finishing frame comprising two lateral finishing supports and two longitudinal finishing supports, said supports forming shaping rails, a distance between middles of the longitudinal finishing supports being shorter than a distance between middles of the lateral finishing supports, the longitudinal roughing mold or the finishing frame being able to be moved vertically one relative to the other during bending in order to switch from a rough-bending configuration to a final-bending configuration, the sheet of glass comprising two lateral edges and two longitudinal edges, a distance between the middles of the longitudinal edges of the sheet being shorter than a distance between the middles of the lateral edges of the sheet, the method comprising:

supporting the sheet of glass by the device in the rough-bending configuration and, in order to undergo rough-bending, the longitudinal edges of the sheet of glass being bent by contact with the shaping rails of the longitudinal roughing supports, and switching the device to the final-bending configuration in order to make the sheet of glass undergo a final bending, the sheet of glass then being bent in contact with the shaping rails of the longitudinal finishing supports and in contact with the shaping rails of the lateral finishing supports, wherein, in the rough-bending configuration, the shaping rails of the longitudinal roughing supports are higher up than the shaping rails of the longitudinal finishing supports, and wherein, in the final-bending configuration, the shaping rails of the longitudinal finishing supports are higher up than the shaping rails of the longitudinal rough-molding supports, and wherein the shaping rails of the lateral finishing supports are the only shaping rails under the two lateral edges of the glass in the rough-bending configuration and in the final-bending configuration, and wherein during the rough bending, the middles of the lateral edges of the sheet do not come into contact with the shaping rails of the lateral finishing supports.

11. The method as claimed in claim 10, wherein, at the end of the bending, the edges of the sheet of glass fully follow the shaping rails of the longitudinal finishing supports and the shaping rails of the lateral finishing supports.

12. A method for gravity-bending of a sheet of glass at a deformation temperature using a device comprising a longitudinal roughing mold comprising two longitudinal roughing supports, and a finishing frame comprising two lateral finishing supports and two longitudinal finishing supports, said supports forming shaping rails, a distance between middles of the longitudinal finishing supports being shorter than a distance between middles of the lateral finishing supports, the longitudinal roughing mold or the finishing frame being able to be moved vertically one relative to the other during bending in order to switch from a rough-bending configuration to a final-bending configuration, the sheet of glass comprising two lateral edges and two longitudinal edges, a distance between the middles of the longitudinal edges of the sheet being shorter than a distance between the middles of the lateral edges of the sheet, the method comprising:

supporting the sheet of glass by the device in the rough-bending configuration and, in order to undergo rough-bending, the longitudinal edges of the sheet of glass being bent by contact with the shaping rails of the longitudinal roughing supports, and switching the device to the final-bending configuration in order to make the sheet of glass undergo a final bending, the sheet of glass then being bent in contact with the shaping rails of the longitudinal finishing supports and in contact with the shaping rails of the lateral finishing supports, wherein, in the rough-bending configuration, the shaping rails of the longitudinal roughing supports are higher up than the shaping rails of the longitudinal finishing supports, and wherein, in the final-bending configuration, the shaping rails of the longitudinal finishing supports are higher up than the shaping rails of the longitudinal rough-molding supports, and wherein the shaping rails of the lateral finishing supports are the only shaping rails under the two lateral edges of the glass in the rough-bending configuration and in the final-bending configuration, and wherein 4 to 10 mm of glass at the periphery of the sheet are not supported on the finishing frame at the end of bending.

13. A method for gravity-bending of a sheet of glass at a deformation temperature using a device comprising a longitudinal roughing mold comprising two longitudinal roughing supports, and a finishing frame comprising two lateral finishing supports and two longitudinal finishing supports, said supports forming shaping rails, a distance between middles of the longitudinal finishing supports being shorter than a distance between middles of the lateral finishing supports, the longitudinal roughing mold or the finishing frame being able to be moved vertically one relative to the other during bending in order to switch from a rough-bending configuration to a final-bending configuration, the sheet of glass comprising two lateral edges and two longitudinal edges, a distance between the middles of the longitudinal edges of the sheet being shorter than a distance between the middles of the lateral edges of the sheet, the method comprising:

supporting the sheet of glass by the device in the rough-bending configuration and, in order to undergo rough-bending, the longitudinal edges of the sheet of glass being bent by contact with the shaping rails of the longitudinal roughing supports, and switching the device to the final-bending configuration in order to make the sheet of glass undergo a final bending, the sheet of glass then being bent in contact with the shaping rails of the longitudinal finishing supports and in contact with the shaping rails of the lateral finishing supports, wherein, in the rough-bending configuration, the shaping rails of the longitudinal roughing supports are higher up than the shaping rails of the longitudinal finishing supports, and wherein, in the final-bending configuration, the shaping rails of the longitudinal finishing supports are higher up than the shaping rails of the longitudinal rough-molding supports, and wherein the shaping rails of the lateral finishing supports are the only shaping rails under the two lateral edges of the glass in the rough-bending configuration and in the final-bending configuration, and wherein at the end of bending, a depth of lateral bending is between 5 and 20 mm.

14. The method as claimed in claim 13, wherein at the end of bending, the depth of lateral bending is between 8 and 17 mm.

15. A method for gravity-bending of a sheet of glass at a deformation temperature using a device comprising a longitudinal roughing mold comprising two longitudinal roughing supports, and a finishing frame comprising two lateral finishing supports and two longitudinal finishing supports, said supports forming shaping rails, a distance between middles of the longitudinal finishing supports being shorter than a distance between middles of the lateral finishing supports, the longitudinal roughing mold or the finishing frame being able to be moved vertically one relative to the other during bending in order to switch from a rough-bending configuration to a final-bending configuration, the sheet of glass comprising two lateral edges and two longitudinal edges, a distance between the middles of the longitudinal edges of the sheet being shorter than a distance between the middles of the lateral edges of the sheet, the method comprising:

supporting the sheet of glass by the device in the rough-bending configuration and, in order to undergo rough-bending, the longitudinal edges of the sheet of glass being bent by contact with the shaping rails of the longitudinal roughing supports, and switching the device to the final-bending configuration in order to make the sheet of glass undergo a final bending, the sheet of glass then being bent in contact with the shaping rails of the longitudinal finishing supports and in contact with the shaping rails of the lateral finishing supports, wherein, in the rough-bending configuration, the shaping rails of the longitudinal roughing supports are higher up than the shaping rails of the longitudinal finishing supports, and wherein, in the final-bending configuration, the shaping rails of the longitudinal finishing supports are higher up than the shaping rails of the longitudinal rough-molding supports, and wherein the shaping rails of the lateral finishing supports are the only shaping rails under the two lateral edges of the glass in the rough-bending configuration and in the final-bending configuration, and wherein a ratio between a developed distance between the middles of the lateral edges of the sheet to a developed distance between the middles of the longitudinal edges of the sheet ranges from 1.3 to 2.

\* \* \* \* \*